March 5, 1957  P. E. SEIFRIED  2,783,732
ATTITUDE INDICATING INSTRUMENT
Filed Feb. 23, 1955  2 Sheets-Sheet 1
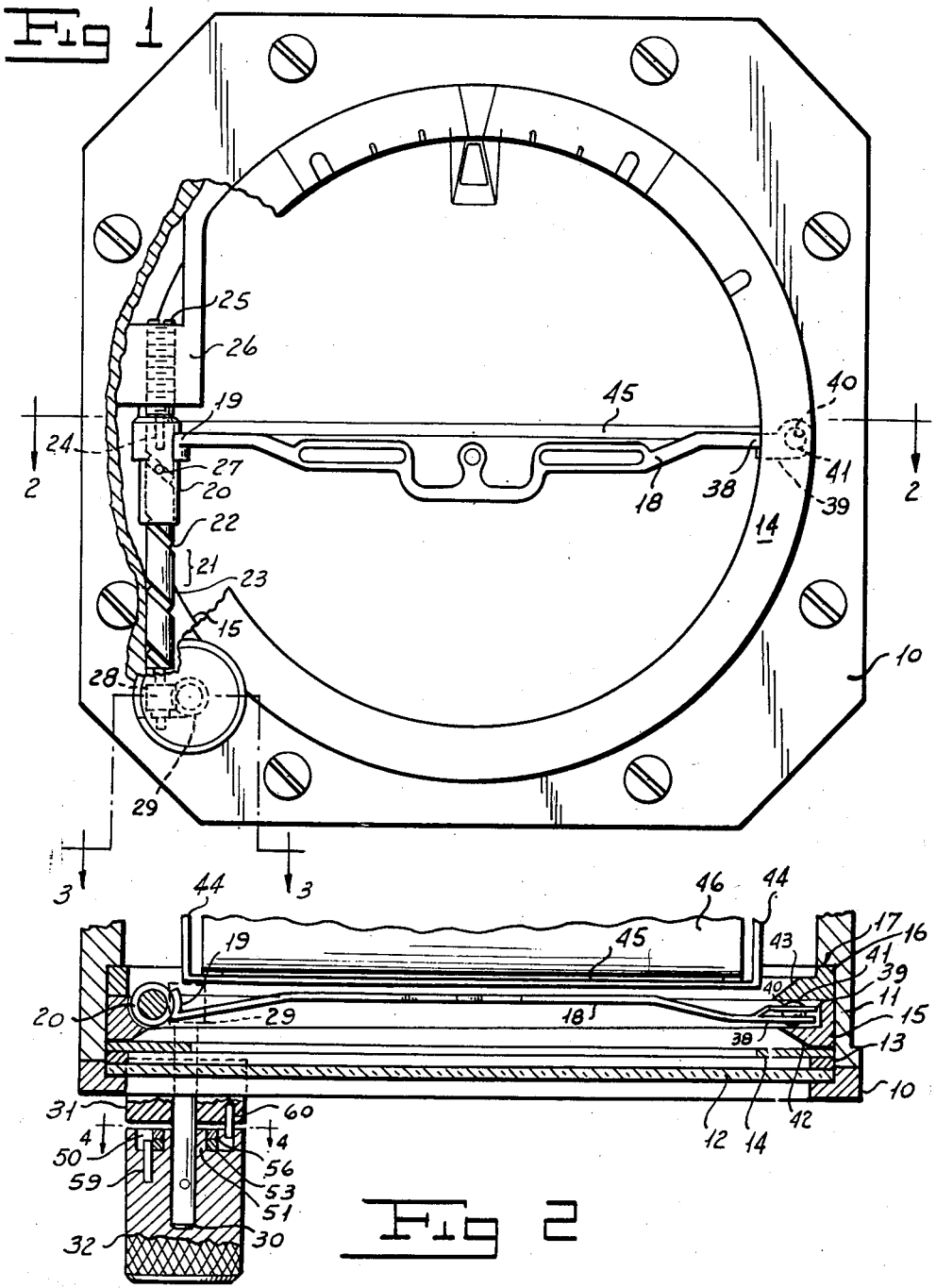
INVENTOR
PAUL E. SEIFRIED
BY
ATTORNEY March 5, 1957 P. E. SEIFRIED 2,783,732
ATTITUDE INDICATING INSTRUMENT
Filed Feb. 23, 1955 2 Sheets-Sheet 2
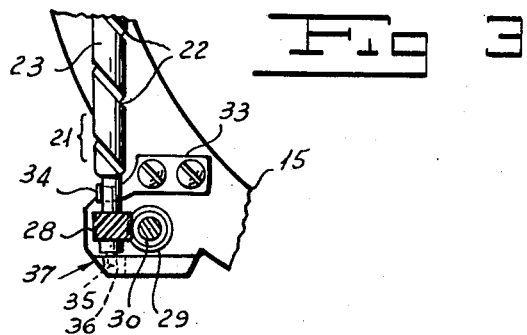
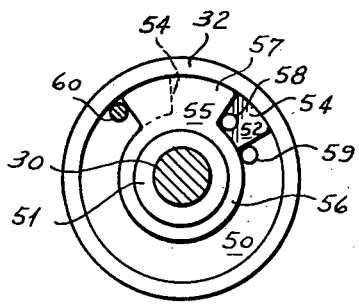
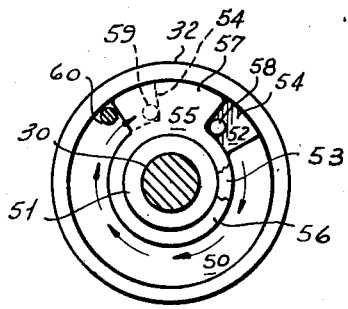
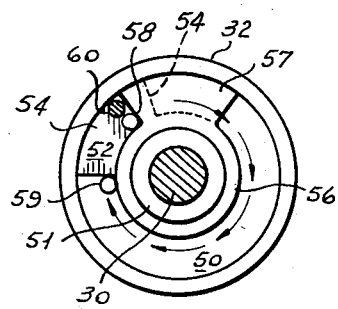
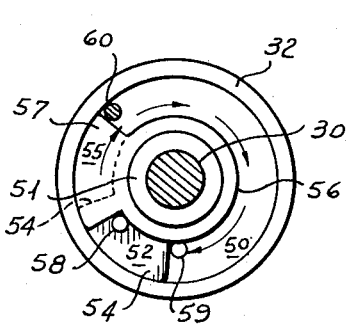
INVENTOR
PAUL E. SEIFRIED
BY
Geo. G. Hyde
ATTORNEY United States Patent Office 2,783,732
Patented Mar. 5, 1957

2,783,732
ATTITUDE INDICATING INSTRUMENT

Paul E. Seifried, New City, N. Y., assignor to Bendix Aviation Corporation, Teterboro, N. J., a corporation of Delaware Application February 23, 1955, Serial No. 489,972

6 Claims. (Cl. 116—129)

This invention relates to attitude indicating instruments of the type used in aircraft to indicate deviations in pitch and bank from the correct flying attitude of the craft. One well-known form of such instruments includes a vertical gyroscope mounted in a gimbal structure carrying a horizon bar or line or lines directly back of the instrument window, cooperating with an attitude reference bar carried by the body of the instrument, and generally with indicia on an annular dial, to show the craft's attitude at a glance. In such instruments it is important to provide means for vertically adjusting the attitude reference bar, since the craft's correct pitch angle for horizontal flight will vary with different loading and other conditions.

An object of the invention is to provide improved and novel means for the vertical adjustment of the attitude reference bar. More specific objects are to provide adjusting means that is simple, positive in action, durable under service conditions and adapted for use with standard types of instruments. A further object is to provide a compact mechanism that will require a minimum of space.

An additional purpose is to provide an arrangement that will readily make fine adjustments of the attitude reference bar position. This is in general accomplished by employing a threaded drive of suitable pitch. A specific object is to provide a drive arrangement for attitude reference bar adjustment including a threaded member along which the bar travels up and down relative to the instrument face, and a drive for said member actuated by an external knob.

With arrangements of this type it is desirable to limit the travel of the bar to prevent interference and possible strain or damage at the ends of its path. Stops are undesirable for this purpose, for with drive mechanism arranged to provide delicate adjustments, the relationship between the drive knob rotation and the attitude reference bar travel is such that excessive pressure would be exerted on the stops, placing the entire drive mechanism under strain. Moreover, such delicate adjustments may require more than one complete revolution of the driving means, including the knob, so that an ordinary stop arrangement engaging the driving means would be impractical under these circumstances.

An object of this invention is to provide the combination of gradual attitude reference bar adjusting mechanism, requiring more than one revolution of the driving means, with stop means engaging the driving means and limiting rotation thereof to a predetermined number of degrees greater than one complete revolution. Another object is to provide stop means of this type incorporated in a drive knob.

A further object is to provide an improved bezel construction suitable for the incorporation of attitude reference bar adjusting means of the indicated type. A related object is to provide an improved bar guiding arrangement.

The foregoing and other objects and advantages of the invention will appear more fully hereinafter from a consideration of the detailed description which follows in conjunction with the accompanying drawings wherein one embodiment of the invention is illustrated. It is to be expressly understood, however, that the drawings are for the purposes of illustration and description and are not to be construed as defining the limits of the invention.

In the drawings:

Fig. 1 is a front elevation of the dial end of the instrument with parts broken away;

Fig. 2 is a section on line 2—2 of Fig. 1, with the operating knob shown in section on line 3—3;

Fig. 3 is an enlarged detail view of one form of drive; and

Figs. 4, 5, 6 and 7 are sections on line 4—4 of Fig. 2, showing successive steps in the operation of the knob rotation limiting mechanism.

The invention is illustrated in its application to an Attitude Indicator of the type illustrated in U. S. Patent No. 2,588,755, Noxon, issued March 11, 1952. This instrument mounted on an aircraft's panel is designed to show at a glance the attitude of the plane, both in pitch and in bank. The present embodiment comprises a bezel 10 screwed to a frame 11, with the cover glass 12, gasket 13 and annular dial 14 held in place between the bezel 10 and the attitude reference bar assembly ring 15, which is held in position by lock ring 16 bearing against shoulder 17 of frame 11.

The attitude reference bar 18, which may be of conventional type as shown, is formed of very light, thin metal, normally an aluminum alloy, and extends across the face of the instrument just in back of dial 14. In the form illustrated one end 19 of bar 18 is fixed, as by soldering, to a cylindrical traveler 20 slidably fitting a rod 21 provided with a spiral groove 22 to form a lead screw 23, which is rotatably mounted on ring 15. The upper end of screw 23 is provided with an axial bore fitting pivot pin 24 on the lower end of pivot screw 25 threaded through an offset 26 in ring 15 and adjusted to provide the proper end play for screw 23. A pin 27 extends through traveler 20 into groove 22.

The reduced lower end of rod 21, as shown in Fig. 3, has fixed thereto a spiral gear 28 meshing with a spiral gear 29 fixed to drive rod 30 which passes through a bore in ring 15 and a registering bore in bezel 10 and boss 31 thereon into operating knob 32, to which it is fixed.

The lower end of rod 21 is provided with a suitable support or bearing. In the particular form illustrated, an arrangement is provided which will prevent backlash between the spiral gears 28 and 29. This includes a spring 33 fixed to ring 15 and having a curved tongue 34 bearing against the outer face of a reduced portion of rod 21, biasing gear 28 against gear 29. Projecting tip 35 of rod 21 fits slidably into a transverse groove 36 in an offset 37 formed on ring 15.

The opposite or right end of the attitude reference bar 18 as shown in Figs. 1 and 2 advantageously is suitably driven or guided to maintain the bar in position parallel to the transverse axis of the craft and to cover glass 12. While attitude reference bars have heretofore been driven at both ends, and the present invention is obviously suitable for such an arrangement, it has been found that in general the bar 18 may be made of metal sufficiently light and strong so that it will maintain the required parallelism when operated from one end only, the other end sliding in a suitable guideway. In an arrangement of this type it has been found advantageous to provide point contacts with the guideway to minimize friction. This may be accomplished in various ways. In the form illustrated said bar end 38 is widened, a registering flat section 39 of similar material is fixed thereto, and round apertures 40 in ends 38 and 39 are proportioned to retain a guide ball 41 which bears lightly against the opposite sides of a slot formed by inward extensions 42 of ring 15 and 43 of lock ring 16.

The portions of the instrument with which the attitude reference bar 18 cooperates may be of standard type, such as those disclosed in the above-mentioned patent. The immediately contiguous parts are shown diagrammatically, including a yoke 44 fixed to the gimbal of a vertical gyro (not shown), provided with a horizon bar 45 and carrying a cylindrical curved shield 46, adapted to bear suitable indicia (not shown).

An arrangement is advantageously provided to prevent shifting the attitude reference bar 18 too close to the ends of the lead screw 23. In the form illustrated, this is accomplished by employing an arrangement engaging the operating knob 32 which will limit the extent of rotation of that knob in both directions, but permitting such rotation for substantially more than one complete turn. In this arrangement, shown in Fig. 2 and Figs. 4–7, knob 32 at its inner end is provided with an annular recess 50 around a central boss 51 coaxial with drive rod 30. An inner flat plate 52 is located in recess 50, and includes a central ring 53 rotatably fitting around the boss 51 and an integral inner segmental drive flange 54 extending outwardly to the outer margin of said recess. Superposed on plate 52 is an outer flat plate 55 which may be of substantially the same size and shape, as shown, including a central ring 56 rotatably fitting boss 51 and an outer segmental drive flange 57 extending to the outer margin of recess 50. Plates 52 and 55 together substantially fill the depth of recess 50.

A flange drive pin 58 is mounted on the inner drive flange 54 and extends outwardly into register with the outer drive flange 57, being located in the inner radial half of the portion of recess 50 outside of ring 56. Knob drive pin 59 is imbedded in knob 32 and extends into the inner radial half of the portion of recess 50 beyond ring 53 into register with the inner drive flange 54, but not far enough to interfere with the movement of the outer drive flange 57. Fixed stop pin 60 carried by boss 31 extends into the outer radial half of the portion of recess 50 beyond the outer ring 56, in register with outer flange 57, but does not extend far enough to interfere with inner flange 54.

In operation, when attitude reference bar 18 is correctly positioned and the aircraft is in the proper attitude for level flight, the attitude reference bar 18 will register accurately with the horizon bar 45. However, changes in conditions, such as different loading of the aircraft, may require the vertical adjustment of the attitude reference bar 18 to bring it into register with the sight line on the horizon bar 45 to show correct level flight attitude, as is well known. This is accomplished very conveniently by rotating knob 32 when the plane is in the correct attitude to bring bars 18 and 45 into alignment. Rotation of said knob will drive lead screw 23 through spiral gears 28 and 29, shifting traveler 20 upwardly or downwardly as required, the adjustment of pivot screw 25 preventing undesirable end play. Bar 18 will move with traveler 20, being held in proper position by the sliding contact of guide ball 40 with the adjacent walls of extensions 42, 43 of rings 15 and 16.

The knob stop arrangement prevents excessive rotation of knob 32, as illustrated in Figs. 4–7. Fig. 4 shows the knob rotated to the limit in counterclockwise direction, with one edge of the outer drive flange 57 abutting the fixed stop pin 60, the flange drive pin 58 bearing against the other edge of flange 57, and the knob drive pin 59 against the right hand edge of inner drive flange 54. As knob 32 is rotated in a clockwise direction, the knob drive pin 59 moves around through recess 50 and past pin 60 into contact with the trailing edge of inner flange 54, a position shown in Fig. 5. Continued rotation of the knob 32 will carry said inner flange around until pin 58 on said flange likewise passes stop pin 60 and contacts the trailing edge of outer drive flange 57, as indicated in Fig. 6. Further clockwise rotation of knob 32 rotates the outer flange 57, as well as the inner flange 54, until the lead edge of the outer flange 57 strikes stop pin 60, as illustrated in Fig. 7, terminating the clockwise rotation of knob 32. From this position it can be returned by a counterclockwise movement, reversing the described operations, to the limit position shown in Fig. 4. It will be evident that the number of rotations, and the exact number of degrees through which the knob 32 can rotate in each direction, can be determined within wide limits by selecting the proper number of plates and the correct circumferential width of the drive flanges on such plates.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

I claim:

1. In an attitude indicating instrument for an aircraft, an attitude reference bar adjusting means comprising a frame having a window opening, a threaded member rotatably mounted in the frame at one side of the opening, a traveler threaded on said member, an attitude reference bar extending across the window opening and fixed at one end to the traveler, guide means including a guide ball carried at another end of the attitude reference bar and means slidably engaging the guide ball at said other end of the attitude reference bar, an adjusting knob rotatably mounted on the frame at the front side of the window opening, and drive gearing connecting the knob and the threaded member.

2. In an attitude indicating instrument for an aircraft, an attitude reference bar adjusting means comprising a frame having a window opening, a threaded member rotatably mounted in the frame at one side of the opening, a traveler threaded on said member, an attitude reference bar extending across the window opening and fixed at one end to the traveler, an adjusting knob rotatably mounted on the frame at the front side of the window opening, and drive gearing connecting the knob and the threaded member, comprising a drive rod fixed to the knob and extending through the frame at right angles to the threaded member, a gear element on the drive rod, a meshing gear element on the threaded member, and backlash preventing means comprising a spring mounted on the frame and bearing against the threaded member on the side opposite to the drive rod, and a bearing for the adjacent end of the threaded member having a zone spaced therefrom, arranged to permit movement of said end toward and from the drive rod.

3. In an attitude indicating instrument for an aircraft, an attitude reference bar adjusting means comprising a frame having a window opening, a threaded member rotatably mounted on the frame at one side of the opening, a pivot screw threaded in the frame in axial alignment with an end of the threaded member, said screw having an end in endwise play-limiting register with said member and including a pivot pin of reduced diameter extending into an axial bearing bore in said member, a traveler threaded on said member, an attitude reference bar extending across the window opening and fixed at one end to the traveler, an adjusting knob rotatably mounted on the frame at the front side of the window opening, and drive gearing connecting the knob and the threaded member.

4. In an attitude indicating instrument for an aircraft, an attitude reference bar adjusting means comprising a frame having a window opening and including a bezel, a mounting ring extending around said opening at the rear of the bezel and engaging the bezel, and a body structure in retaining engagement with the ring and removably attached to the bezel, a threaded member rotatably mounted on the ring behind the bezel at one side of the opening, a traveler threaded on said member, an attitude reference bar extending across the window opening behind the bezel and fixed at one end to the traveler, an adjusting knob rotatably mounted on the front of the bezel, a drive rod fixed to the knob and extending through the bezel, and drive gearing connecting the rod and the threaded member.

5. In an attitude indicating instrument for an aircraft, an attitude reference bar adjusting means comprising a frame having a window opening, a threaded member rotatably mounted in the frame at one side of the opening, a traveler threaded on said member, an attitude reference bar extending across the window opening and fixed at one end to the traveler, an adjusting knob rotatably mounted on the frame at the front side of the window opening, drive gearing connecting the knob and the threaded member, and means carried by the knob for limiting the extent of rotation of said knob to a predetermined amount greater than one complete turn, thereby limiting the approach of the traveler to the ends of the threaded member, comprising a stop element on the frame, a plurality of superposed contiguous drive elements rotatably mounted on the knob in axial alignment therewith, each element having circumferentially spaced drive faces, the element adjacent to the frame having a drive face in transaxial register with said stop element on the frame, and a drive abutment on the knob in transaxial register with a drive face on the adjacent drive element, each pair of contiguous drive elements having a drive projection on one element in transaxial register with a drive face of the other element of the pair.

6. In an attitude indicating instrument for an aircraft; the combination comprising, a frame having a window opening and including a bezel; a mounting ring extending around said opening at the rear of the bezel and engaging the bezel, and a body structure in retaining engagement with the ring and removably attached to the bezel; a threaded member rotatably mounted on the ring behind the bezel at one side of the opening, a traveler threaded on said member; an attitude reference bar extending across the window opening behind the bezel and fixed at one end to the traveler, a guide ball carried at an opposite end of the attitude reference bar, said guide ball slidably engaged between said mounting ring and body structure; a pivot screw threaded in the mounting ring in axial alignment with an end of the threaded member, said screw having an end in endwise play-limiting register with said member and including a pivot pin of reduced diameter extending into an axial bore in said member; an adjustable knob rotatably mounted on the frame at the front side of the window opening; drive gearing connecting the knob and the threaded member, including a drive rod fixed to the knob and extending through the frame at right angles to the threaded member, a gear element on the drive rod, a meshing gear element on the threaded member; backlash preventing means comprising a spring mounted on the frame and bearing against the threaded member on the side opposite to the drive rod, and a bearing for the adjacent end of the threaded member having a zone spaced therefrom, arranged to permit movement of said end toward and from the drive rod; and means carried by the knob for limiting the extent of rotation of said knob to predetermined amount greater than one complete turn, thereby limiting the approach of the traveler to the ends of the threaded member, comprising a stop element on the frame, a plurality of superposed contiguous drive elements rotatably mounted on the knob in axial alignment therewith, each element having circumferentially spaced drive faces, the element adjacent to the frame having a drive face in transaxial register with said stop element on the frame, and a drive abutment on the knob in transaxial register with a drive face on the adjacent drive element, each pair of contiguous drive elements having a drive projection on one element in transaxial register with a drive face of the other element of the pair.

References Cited in the file of this patent

UNITED STATES PATENTS

| | | |
|---|---|---|
| 1,340,216 | Drepenbrock | May 18, 1920 |
| 2,223,917 | McGlion | Dec. 3, 1940 |
| 2,588,755 | Noxon | Mar. 11, 1952 |

OTHER REFERENCES

Publication: "Aircraft Engineering," Oct. 1944, pages 288–289.